No. 765,707. PATENTED JULY 26, 1904.
E. MATHIEU.
CHANGE SPEED GEAR FOR MOTOR CARRIAGES.
APPLICATION FILED APR. 29, 1902.
NO MODEL. 6 SHEETS—SHEET 1.

WITNESSES
INVENTOR
Eugene Mathieu
BY
ATTORNEYS

No. 765,707. PATENTED JULY 26, 1904.
E. MATHIEU.
CHANGE SPEED GEAR FOR MOTOR CARRIAGES.
APPLICATION FILED APR. 29, 1902.
NO MODEL. 6 SHEETS—SHEET 2.
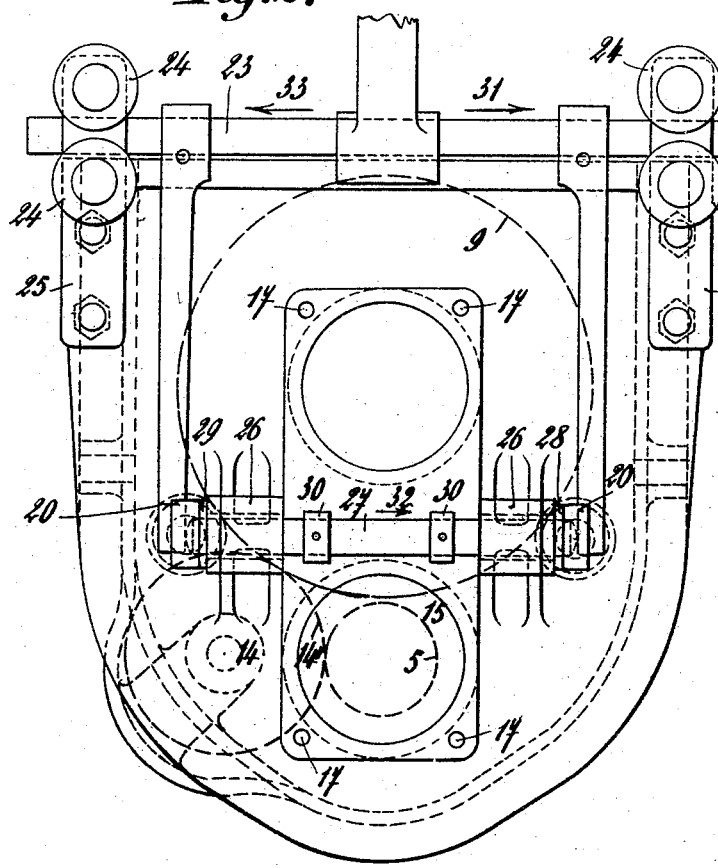
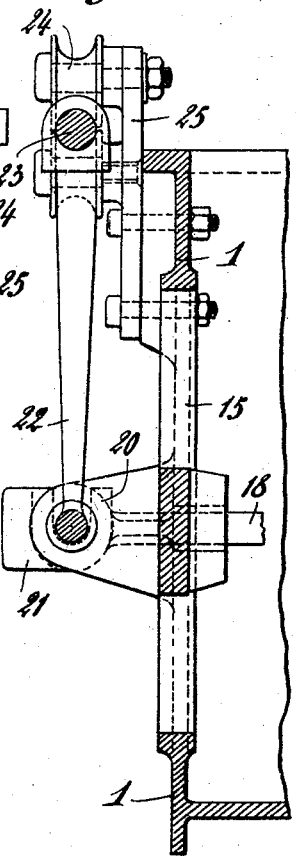
WITNESSES
INVENTOR
Eugene Mathieu
ATTORNEYS

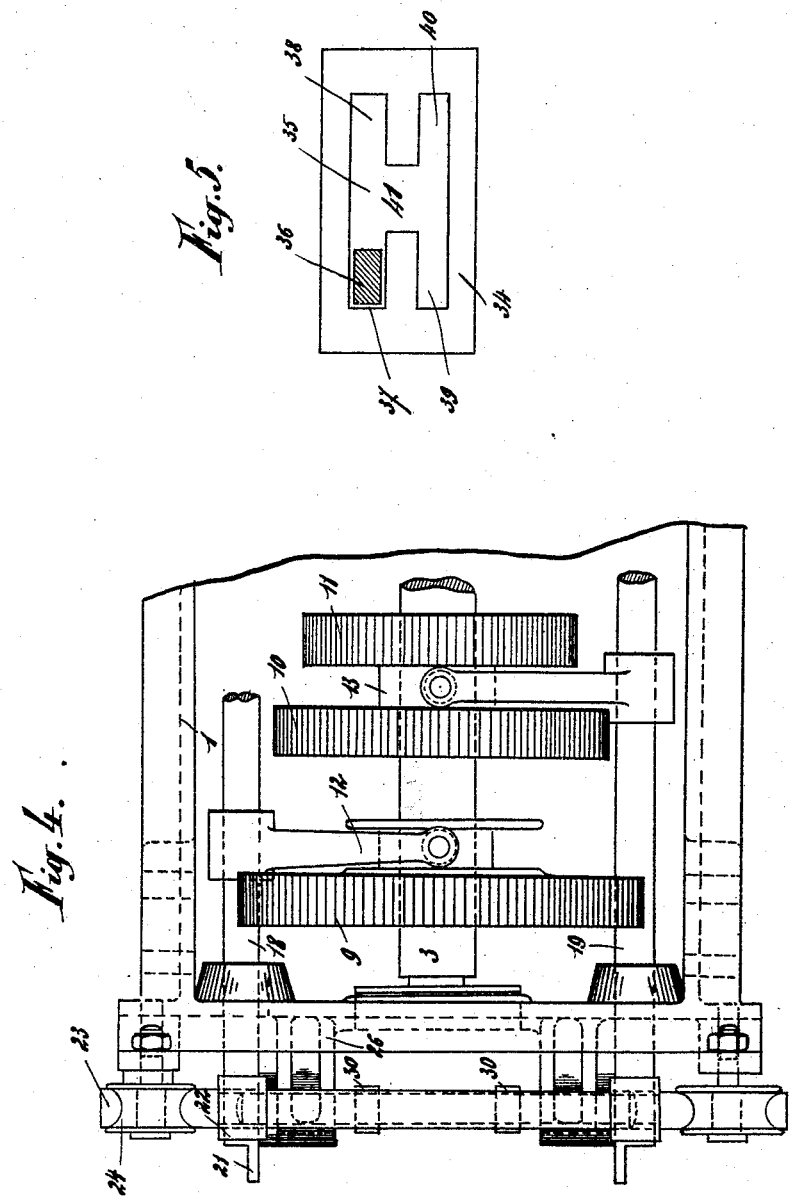

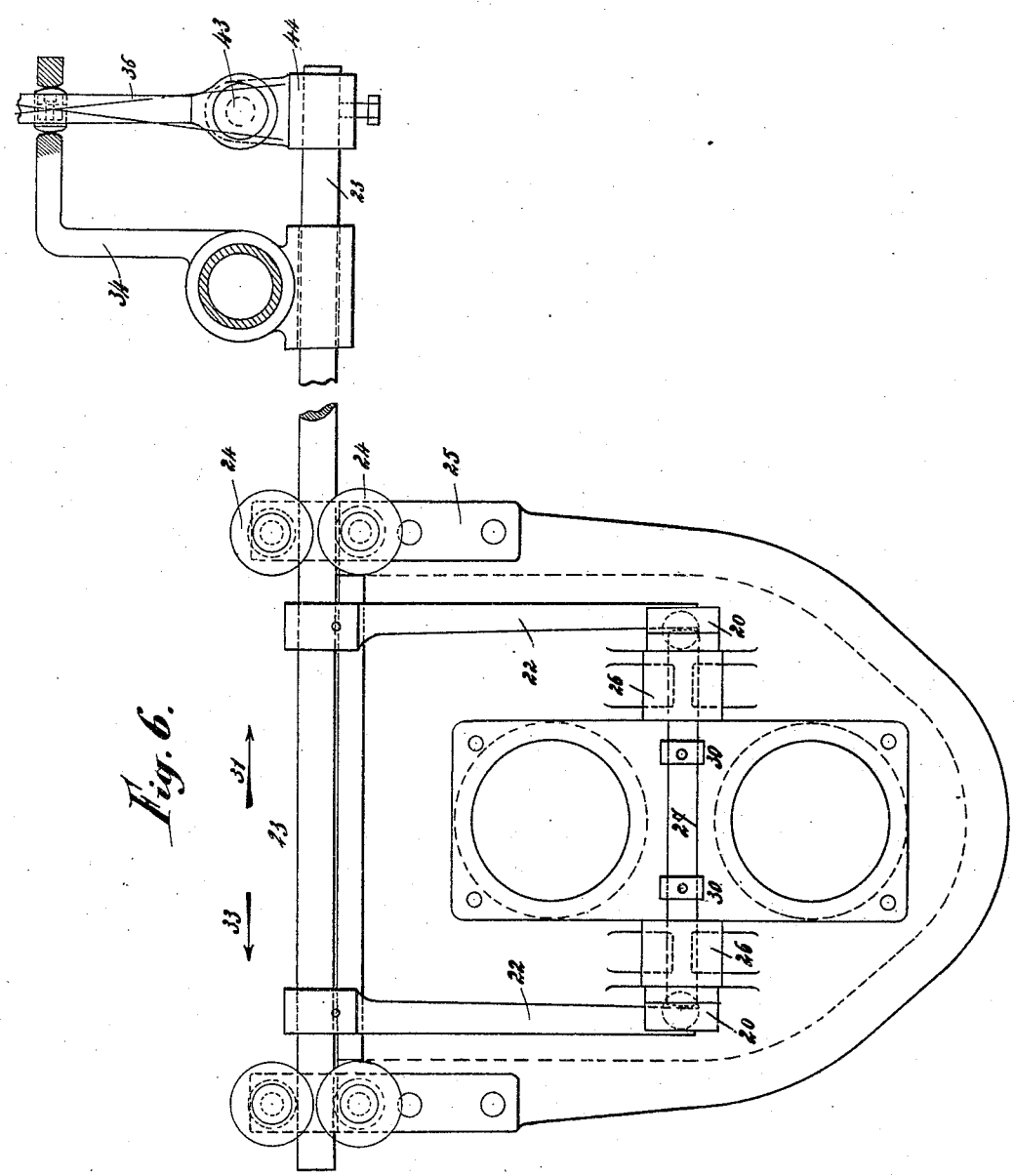

No. 765,707. PATENTED JULY 26, 1904.
E. MATHIEU.
CHANGE SPEED GEAR FOR MOTOR CARRIAGES.
APPLICATION FILED APR. 29, 1902.
NO MODEL. 6 SHEETS—SHEET 5.
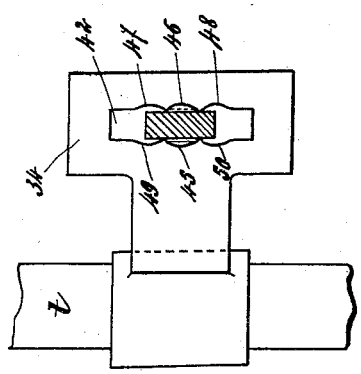
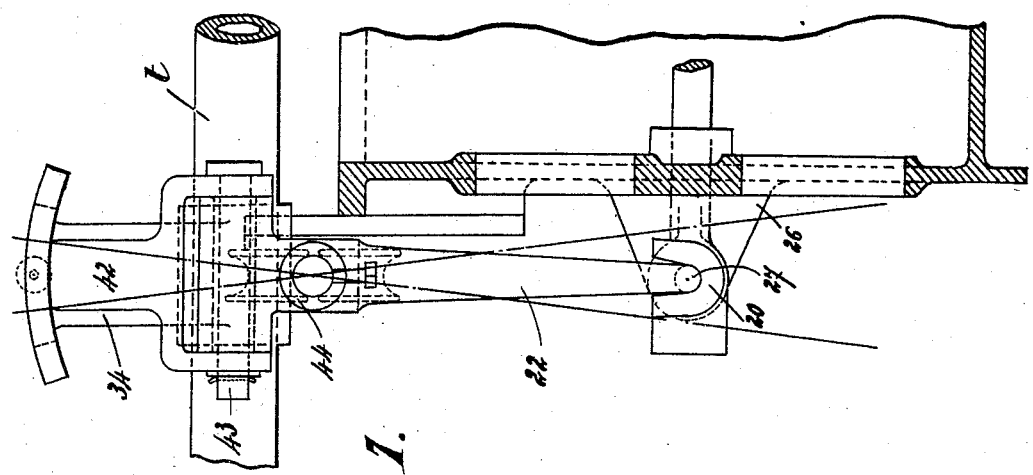

No. 765,707. PATENTED JULY 26, 1904.
E. MATHIEU.
CHANGE SPEED GEAR FOR MOTOR CARRIAGES.
APPLICATION FILED APR. 29, 1902.
NO MODEL. 6 SHEETS—SHEET 6.

WITNESSES
H. M. Kuehne
M. I. Welch

INVENTOR
Eugene Mathieu
BY Richards R
ATTORNEYS

No. 765,707.

Patented July 26, 1904.

UNITED STATES PATENT OFFICE.

EUGENE MATHIEU, OF LOUVAIN, BELGIUM.

CHANGE-SPEED GEAR FOR MOTOR-CARRIAGES.

SPECIFICATION forming part of Letters Patent No. 765,707, dated July 26, 1904.

Application filed April 29, 1902. Serial No. 105,174. (No model.)

*To all whom it may concern:*

Be it known that I, EUGENE MATHIEU, engineer, a citizen of the Republic of France, residing at 37 Rue de la Station, Louvain, in the Kingdom of Belgium, have invented certain new and useful Improvements in Change-Speed Gear for Motor-Carriages, of which the following is a specification.

This invention relates to change-speed gear for motor-carriages, the object being not only to simplify the construction and the mounting of the mechanism, but to provide a safety controlling arrangement of simple and efficient construction in which any false manipulation is rendered absolutely impossible by reason of the fact that the actuation of any one train of gearing automatically locks the other trains of gearing in an inoperative position.

The invention consists in the combination, arrangement, and construction of parts hereinafter referred to and particularly pointed out in the claims.

In order to have my invention fully understood, I will describe the same with reference to the annexed drawings, in which—

Figure 1:
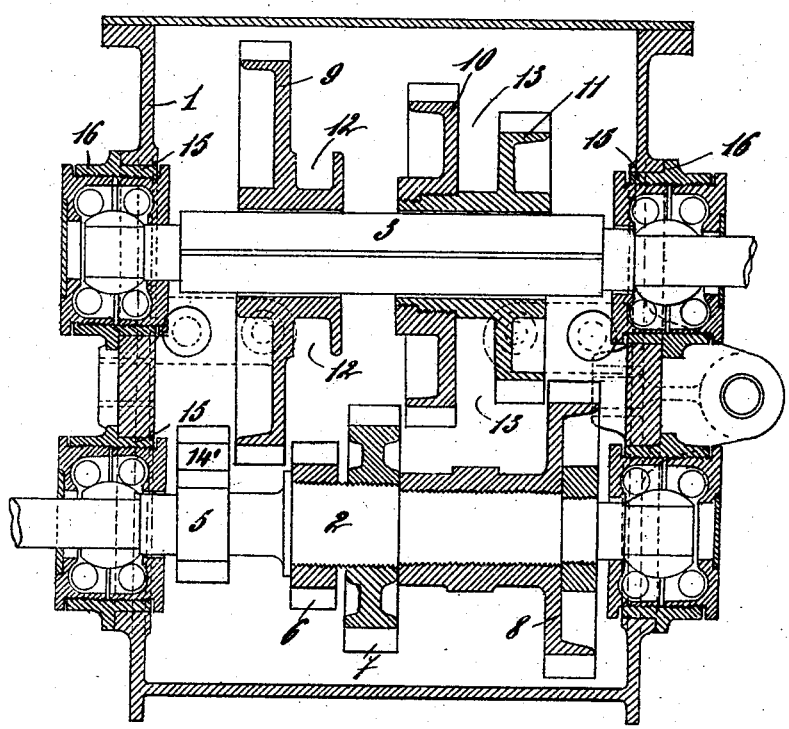
Figure 9:
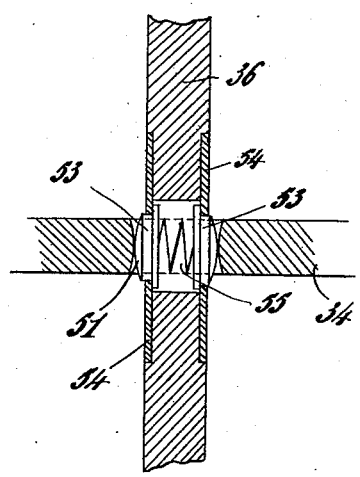
Figure 10:
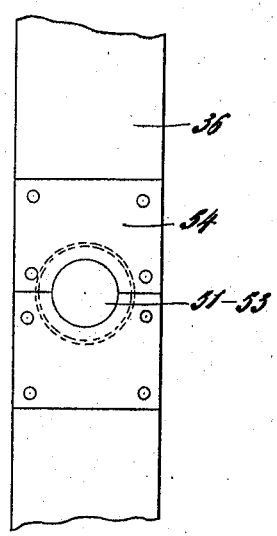
Figure 11:
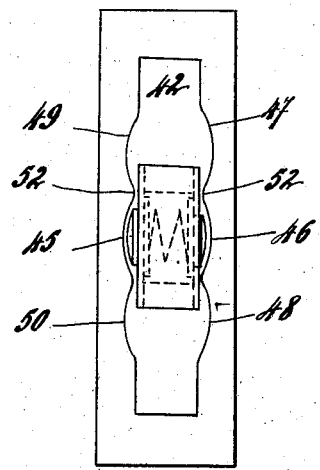
Figure 12:
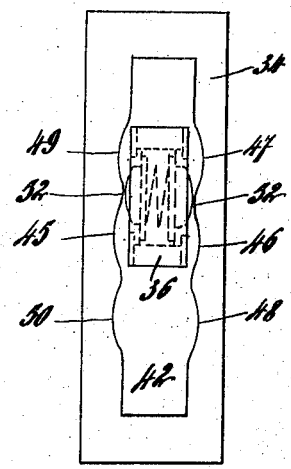

Figure 1 is a vertical section through the casing inclosing the change-speed gear. Fig. 2 is an end view showing more particularly the locking means. Fig. 3 is a partly-sectional view and partly side view showing more particularly the cranks acting upon the controlling-rod of the trains of gearing. Fig. 4 is a top view of the said mechanism. Fig. 5 shows a detail. Fig. 6 is a front view of the locking means combined with a special actuating-lever. Fig. 7 is a side view of the said means and lever, and Fig. 8 shows a detail of the lever shown in Figs. 5 and 7. Figs. 9 and 10 are respectively a vertical section and a front view, at an enlarged scale, of the lever shown in Fig. 6, the said views showing a detail of construction of the said lever. Figs. 11 and 12 are two views similar to Fig. 8, showing, at an enlarged scale, how the lever is adapted to pass from a given position to another.

The change-speed gear proper is inclosed in a frame consisting of a case 1, of aluminium, for example, made in one piece, with the exception of the cover, however, which forms a separate part. This case 1 in the example shown incloses two shafts 2 and 3, one of which carries four toothed wheels 5 6 7 8, keyed upon the said shaft, and the other, 3, two trains of driving-gear, one of which consists of one toothed wheel 9 and the other of two toothed wheels 10 11, fixed to each other.

The gear-wheel 9 on the shaft 3 when it is moved along the shaft by means of a fork engaging in a groove 12 gears either with the toothed wheel 6 on shaft 2 for the purpose of driving at a first given speed or with the toothed wheel 5 through the medium of a small loose pinion 14', mounted on a small shaft 14, Fig. 2. This latter position of the gear-wheel 9 thus causes a backward travel. Similarly, according to the position given to the toothed wheel 10 11 upon the shaft 3 by means of a fork engaging in a space 13, comprised between these toothed wheels, the toothed wheel 10 can be geared with the toothed wheel 7 on the shaft 2 for the purpose of obtaining a second given speed or the toothed wheel 11 on the shaft 3 with the toothed wheel 8 on the shaft 2 for the purpose of obtaining a third given speed.

As will be readily understood with regard to the construction of the casing 1 in one piece, the mounting of the shafts 2 3 could not be effected in the ordinary way. In order to allow this mounting, the casing 1 is made with relatively large apertures 15 to allow of introducing the shafts by causing them to assume a more or less inclined position. In these apertures are afterward placed boxes 16, containing the ball-bearings designed to support the shafts 2 and 3. The boxes 16 of these bearings are fixed upon the outer surface of the casing 1 by means of bolts 17, Fig. 2. The displacement of the trains of gearing 9 and 10 11 on the shaft 3 is effected, as already stated, by means of forks engaging in the grooves 12 and 13. These forks are fixed to rods 18 19, extending horizontally into the casing 1 parallel with the shafts 2 and 3. Each of these rods passes through the front wall of the casing 1 and is terminated by a fork 20, provided with a plate 21, the object of which will be hereinafter explained. In the forks 20 are engaged the ends of cranks 22, keyed upon a horizontal shaft 23, guided, for example, between rollers 24, having semicircular grooves and mounted upon suitable brackets 25. The said horizontal shaft 23 can have a movement of partial rotating and a movement of longitudinal displacement in the direction of its axis imparted to it by means of an operating-lever arranged in a well-known manner, so as to allow it to oscillate in two planes perpendicular to one another.

Between the forks 20, terminating the rods 18 19, is arranged in brackets 26, Fig. 2, a horizontal bar 27, the ends 28 29 of which engage, respectively, in about half the thickness of the forks 20 of the two rods 18 19. This bar 27, moreover, is provided with collars 30, the position of which is regulated in such a manner that if the said bar 27 has just been moved laterally in either direction it completely engages with its right-hand end 28, for example, in the right-hand fork 20, while its left-hand end 29 is completely disengaged from the left-hand fork 20, in which it was previously engaged for only a portion of its length.

It will be easy from the preceding description to understand the operation of the controlling arrangement hereinbefore described and the manner in which absolute security is obtained through the locking of the inoperative trains of driving-gear with relation to the operating-train of driving-gear. Suppose it is required to drive at the first given speed by gearing the toothed wheel 6 with the toothed wheel 9. The horizontal shaft 23 must be moved toward the right hand in the direction of the arrow 31, Fig. 2, by means of the operating-lever. (Not shown.) By reason of this movement the left-hand crank 22 is completely engaged in the fork 20 of the rod 18, while the right-hand crank is completely disengaged from the fork 20 of the rod 19. Simultaneously the left-hand crank 22 pushes back the bar 27 in the direction of the arrow 32, Fig. 2, thus completely disengaging the end 29 of the bar 27 from the fork 20 of the rod 18, while the other end, 28, becomes completely engaged in the fork 20 of the right-hand rod 19. The latter consequently becomes absolutely locked in this position, in which the toothed wheels 10 and 11 are both disengaged from the toothed wheels 7 and 8. If then the operating-lever is oscillated so as to communicate a partial rotation to the horizontal shaft 23, the two cranks 22 will be oscillated and the crank engaged with the fork 20 of the rod 18 cause a longitudinal displacement of the said rod and the gearing of the toothed wheel 9 either with the toothed wheel 6, corresponding to the first speed of forward travel, or with the intermediate roller between the toothed wheel 9 and the toothed wheel 5, which cause the backward travel. During this movement the second crank 22, completely disengaged from the fork of the rod 19, will freely move against the lateral face of the said fork without bringing about any displacement of this rod 19, locked, as already stated, by the end 28 of the bar 27, the position of the said bar being insured, on the one hand, by the collar 30 bearing against the bracket 26 and, on the other hand, by the flat part 21 of the fork 20 of the rod 18, which by the displacement of the said rod bears against the end 29 of the bar 27. If then it is required to change from the first to the second or to the third speed, it is only necessary to move the operating-lever in the reverse direction, so as to cause the horizontal shaft 23 and the cranks 22 to again oscillate. This oscillation brings back the rod 18 into its former position, so that the fork 20 becomes displaced in the direction of the axis of the bar 27. The operating-lever must then be oscillated so as to move the horizontal shaft 23 longitudinally in the direction of the arrow 33, Fig. 2. In consequance of this movement the crank 22, controlling the rod 18, becomes entirely disengaged from the fork 20 of the said rod, while the crank 22 of the rod 19 becomes again engaged in the fork 20 of the latter rod and pushes back toward the left hand the locking-bar 27, the right-hand end 28 of which becomes disengaged from the fork 20 of the right-hand rod 19, while the other end, 29, becomes completely engaged in the fork of the rod 18, thus insuring the locking of the latter. A fresh oscillation of the operating-lever, causing a fresh partial rotation of the horizontal shaft 23 will then bring about a longitudinal displacement of the rod 19, and consequently the gearing either of the wheel 10 with the wheel 7 or of the toothed wheel 11 with the toothed wheel 8, as the case may be.

The different oscillating movements of the controlling-lever designed to cause the movements of displacement and rotation, hereinbefore described, of the horizontal shaft 23 can be easily effected in a known manner by means of a lever adapted to be moved in two perpendicular planes and to successively take each of the different positions shown, Fig. 5, in a guide-plate 34, provided with a double T-shaped slot 35. It will be easily understood that all the necessary movements can be obtained by causing the lever 36 to successively take each of the positions 37, 38, 39, or 40, the fifth position 41 being the position correponding to the disengagement of the two trains of driving-gear. When the lever is in the first position—37, for example—the rod 18 will cause the engagement of the toothed wheel 9 with the toothed wheel 6. The oscillation of the lever 36 out of this position to bring it into the second position 38 will cause a partial rotation of the horizontal shaft 23, forcing the rod 18 to bring about the gear of the toothed wheel 9 with the roller of the toothed wheel 5, effecting the backward travel. On the other hand, the oscillation of the lever 38 from the first position 37 to bring it into the fifth position 41 will cause a partial rotation of the horizontal shaft 23 and its partial longitudinal displacement, thus causing the locking of the two rods 18 19 by the bar 27. The subsequent movement from the fifth position to the third or fourth position 39 40 will effect the longitudinal displacement of the horizonal shaft 23 in one or the other direction, and consequently the complete locking of the rod 18 and the unlocking of the rod 19, followed by the rotation of the horizontal shaft 23, causing the engagement of the toothed wheel 10 with the toothed wheel 7 or of the toothed wheel 11 with the toothed wheel 8, according as the lever is brought from the fifth position 41 into the position 39 or into the position 40. The same result can also be obtained and is preferably obtained by means of an oscillating lever 36, Figs. 6, 7, 8, movable in a single slot 42 in a guiding-sector 34, allowing a certain lateral play for the lever, so as to permit it to oscillate and bear against the edges of the said guiding-slot. In this case the lever is connected to the horizontal shaft 23 by a pivot 43 in a sleeve 44 at the end of the horizontal controlling-shaft 23 of the change-speed gear, and the single guide-slot has on each of its edges three locking-notches 45 46, 47 48, and 49 50. In this construction the lever 36 is provided, Figs. 9 and 10, at a level corresponding to the level of the guiding-sector 34 with a double spring-button 51, comprising two buttons 53, inclosed in the lever 36 by plates 54, screwed on the lateral faces of the lever. The said buttons are subjected to the action of a spring 55, which normally forces the said buttons outward, so as to be prominent over the faces of the lever. These buttons 53 are adapted to maintain the lever 36 in each of the locking-notches 45 46, 47 48, and 49 50, as shown more clearly in Fig. 11, in which the lever 36 is assumed to be placed between the opposite notches 45 46. The said buttons, however, do not prevent the lever 36 from being oscillated either perpendicularly to the direction of the guiding-slot 42 or in the direction of the said slot, Fig. 12. In the first instance the position of the said buttons becomes slightly inclined with regard to the guiding-slot 42, the buttons sliding with their spherical surface against the rounded edges of the notches of the guiding-slot 42. In the second instance, when the lever is to be moved in the direction of the guiding-slot 42, Fig. 12, so as to pass from the notch 45 to the notch 49, for instance, or from the notch 46 to the notch 47, the buttons 53 at the moment they pass the ribs 52 existing between the several notches are pressed inward by the said ribs, said inward movement being permitted by the compression of the spring 55, Fig. 9. As soon as the lever has passed the separating-ribs 52 the buttons 53 are pressed outward and adapted to maintain the lever in its new position.

It will be understood that the oscillation of the lever 36, Fig. 6, over the edge of the slot is only possible when the lever is in its mean position corresponding to the middle locking-notches 45 46, this position being that in which the two cranks 22 are simultaneously engaged in the forks 20 of the controlling-rods 18 19 of the engaging forks, and in which consequently the horizontal shaft 23 can be displaced longitudinally. On the other hand, in this mean position the lever cannot move in the slot, the rotation of the horizontal shaft necessary for this purpose being prevented by the engagement of the locking-bar 27 in the two forks. The lever being in its mean position, if it be caused to slightly oscillate, so as to be brought in one of the inclined positions shown, Figs. 9 and 10, using one of the edges of the slot of the guide-plate 34 as a bearing-point, it will be brought into one of the middle locking-notches 45 or 46, and by this means the horizontal shaft 23 will be displaced longitudinally in one or the other direction, (see arrows 31 32, Fig. 6 and Figs. 9 and 10,) consequently unlocking one of the engaging rods 18 19. The lever 36 can then be moved in the slot, as above indicated, and be brought into one of its extreme positions 47 48 or 49 50, in which it brings about the gearing of one of the driving-trains.

When the lever has been displaced from the mean position of oscillation, it can no longer oscillate, this movement being prevented by the locking and by the disengagement of one of the cranks of the corresponding fork. A change from one speed to another can therefore in no case be effected without causing the lever 36 to pass from its neutral mean position, or position of oscillation determined by the middle locking-notches 45 46. This arrangement of operating-lever not only simplifies the construction, but considerably diminishes the risk of jamming and friction.

As will be easily understood, the reciprocal locking of the rods 18 19, and consequently of the forks controlling the trains of driving-gear, will be insured in each position of travel, and a change can be directly effected from the first speed to the backward travel, while in order to change from the first speed to the second or to the third speed the operator is compelled to pass through the intermediate position, insuring the disengagement of the train of gearing previously in operation. Any false manipulation will be consequently surely avoided, while at the same time the possibility is retained of changing directly from one given speed to another without passing through the intermediate speeds.

I have described, by way of example, the application of my invention in the case of a change of speed, comprising a backward speed and three speeds for forward travel. It is, however, obvious that I can without departing from the principle of my invention arrange the parts so as to apply the system hereinbefore described to any number of speeds.

In the example represented the horizontal shaft is guided between rollers 24, designed to insure its facility of movement. It will, however, be evident that these rollers can be replaced by any other suitable guiding arrangement.

Having thus described my invention, what I claim is—

1. In a change-speed gear in combination a case, two shafts mounted in said case, toothed wheels keyed upon one of the said shafts and toothed wheels adapted to be moved along the second shaft, rods for moving the said toothed wheels along the second shaft, cranks acting on the said rods in forks provided at the ends of these rods and a locking-bar acting in the same forks as the cranks and adapted to lock the actuating-rods or one of these rods according to the position of the cranks, substantially as set forth.

2. In a change-speed gear comprising a casing two shafts mounted in said casing, toothed wheels keyed upon one of the said shafts and toothed wheels adapted to be moved along the second of said shafts, the combination with the movable toothed wheels of two rods carrying forks acting on the toothed wheels and provided each with a fork at the end outside the casing, of cranks acting in said forks, of a locking-bar suitably supported between the said cranks and having its ends engaged in the forks in which act the cranks, and means whereby the cranks may be simultaneously displaced longitudinally in order to be totally engaged or disengaged with one of the forks of the actuating-rods and simultaneously oscillated so as to act on the actuating-rod with which one of the cranks is in engagement, substantially as described and for the purpose set forth.

3. In a change-speed gear comprising a casing two shafts mounted in said casing, toothed wheels keyed upon one of the said shafts and toothed wheels adapted to be moved along the second of said shafts, the combination with two rods actuating the movable toothed wheels and provided with forks at the ends outside the casing, of two cranks engaged in the forks of said rods, a horizontal shaft upon which the two cranks are keyed, said shaft being adapted to be rotated partially and to be longitudinally displaced in the direction of its axis and means whereby the partial rotation of the said horizontal shaft and cranks is prevented when the two cranks are engaged simultaneously in the forks of the actuating-rods and can only take place when one of the cranks is disengaged from one of the forks of the actuating-rods, substantially as described and for the purpose set forth.

4. In a change-speed gear comprising a casing two shafts mounted in said casing, toothed wheels keyed upon one of the said shafts and toothed wheels adapted to be moved along the second of said shafts, and two rods actuating the movable toothed wheels and provided with forks at the ends outside the casing, the combination of a horizontal shaft two cranks keyed on said horizontal shaft and acting in the forks of the actuating-rods, of a locking-bar placed between said cranks and acting also in the forks of the actuating-rods of a lever acting on the horizontal shaft carrying the cranks and of a guiding-sector, the said lever being adapted to be moved in said guiding-sector provided with a single slot and to be oscillated in said slot so as to displace the crank-shaft longitudinally substantially as described and for the purpose set forth.

In witness whereof I have hereunto set my hand in presence of two witnesses.

EUGENE MATHIEU

Witnesses:
 GEORGE BEDE,
 GREGORY PHELAN.